(12) United States Patent
Kimminau et al.

(10) Patent No.: US 7,778,780 B2
(45) Date of Patent: *Aug. 17, 2010

(54) WELL CHARACTERISATION METHOD

(75) Inventors: Stephen J. Kimminau, Sudbury (GB); Mohammed Rupawalla, Sugar Land, TX (US); Kashif Rashid, Middlesex (GB); David Michael Hargreaves, Cambridge (GB); Cyril Lagrange, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 204 days.

This patent is subject to a terminal disclaimer.

(21) Appl. No.: 11/571,829

(22) PCT Filed: May 27, 2005

(86) PCT No.: PCT/GB2005/002110

§ 371 (c)(1),
(2), (4) Date: Nov. 27, 2007

(87) PCT Pub. No.: WO2006/010875

PCT Pub. Date: Feb. 2, 2006

(65) Prior Publication Data

US 2008/0120036 A1    May 22, 2008

(30) Foreign Application Priority Data

Jul. 29, 2004   (GB) ................... 0416871.2

(51) Int. Cl.
*G01V 9/02* (2006.01)
*G01V 9/00* (2006.01)
*G01F 22/00* (2006.01)
*G06F 19/00* (2006.01)
*G06F 17/40* (2006.01)

(52) U.S. Cl. .............. 702/12; 73/152.18; 73/152.29; 374/136; 374/137; 702/187; 702/189

(58) Field of Classification Search ............. 73/152.01, 73/152.02, 152.11, 152.18, 152.29, 152.31, 73/152.33, 152.54, 152.55, 204.11, 861; 166/244.1, 250.01; 175/40, 50; 324/323, 324/324; 374/100, 101, 136, 137; 702/1, 702/2, 6, 11, 12, 13, 33, 45, 50, 127, 130, 702/136, 187, 189; 703/2, 6, 9
See application file for complete search history.

(56) References Cited

U.S. PATENT DOCUMENTS 3,011,342 A * 12/1961 Simm ................. 73/152.33

(Continued)

FOREIGN PATENT DOCUMENTS

GB         2 395 315 A   *   5/2004

(Continued)

OTHER PUBLICATIONS

L Saputelli et al. "Real-Time Decision-making for Value Creation while Drilling" SPE/IADC Middle East Drilling Technology Conference & Exhibition, Oct. 2003.

(Continued)

*Primary Examiner*—Edward R Cosimano
(74) *Attorney, Agent, or Firm*—Van Someren, PC; Brandon S. Clark; Rodney V. Warfford

(57) ABSTRACT

One aspect of the invention relates to a method (10) for characterizing a well (700) using distributed temperature sensor (DTS) data to optimise a well model (12). The method comprises providing a well model of flow and thermal properties (12a, 12b) of the well (700), where the well model (12) has a plurality of adjustable physical parameters, providing a data set made up of a plurality of DTS temperature profiles of the well (700) taken at different times during operation of the well (700), and running the well model (12) with different combinations of the plurality of adjustable physical parameters to match to the plurality of DTS temperature profiles. The DTS temperature profiles may also be pre-processed to make them consistent with one another.

9 Claims, 17 Drawing Sheets

U.S. PATENT DOCUMENTS

| | | | | |
|---|---|---|---|---|
| 3,913,398 | A | * | 10/1975 | Curtis ..................... 73/152.33 |
| 4,559,818 | A | * | 12/1985 | Tsang et al. ............. 73/152.13 |
| 6,618,677 | B1 | | 9/2003 | Brown |
| 6,789,937 | B2 | * | 9/2004 | Haddad et al. .............. 374/136 |
| 2005/0115741 | A1 | | 6/2005 | Terry et al. |
| 2005/0149264 | A1 | * | 7/2005 | Tarvin et al. ................... 702/6 |
| 2006/0077757 | A1 | | 4/2006 | Cox et al. |
| 2007/0213963 | A1 | * | 9/2007 | Jalali et al. ..................... 703/10 |
| 2007/0271077 | A1 | * | 11/2007 | Kosmala et al. ................ 703/5 |
| 2008/0065362 | A1 | * | 3/2008 | Lee et al. ...................... 703/10 |
| 2008/0201080 | A1 | * | 8/2008 | Lovell et al. .................. 702/12 |
| 2009/0182509 | A1 | * | 7/2009 | Kimminau et al. ............ 702/11 |

FOREIGN PATENT DOCUMENTS

| | | | |
|---|---|---|---|
| GB | 2401430 A | * | 11/2004 |
| GB | 2408327 A | | 5/2005 |
| WO | WO98/50680 A2 | | 11/1998 |
| WO | 2004076815 A1 | | 9/2004 |
| WO | WO2004/094961 A1 | | 11/2004 |
| WO | WO2005/035943 A1 | | 4/2005 |
| WO | WO2005/064116 A1 | | 7/2005 |

OTHER PUBLICATIONS

Lanier et al. "Brunei Field Trial of a Fibre Optic Distributed Temperature Sensor(DTS) System in 1,000m Open Hole Horizontal Oil Producer" SPE 84324: SPE Annual Technical Conference and Exhibition, Oct. 5-8, 2003.

Brown, G.A., SPE 62952. "Using Fibre-Optic Distributed Temperature Measurements to Provide Real-Time Reservoir Surveillance Data on Wytch Farm Field Horizontal Extended-Reach Wells" Society of Petroleum Engineers Inc. 2000, pp. 1-11.

* cited by examiner

M17.dts - THERMA
File Edit Tool Document Window Help

Work Flow

Getting Started
- Unit System
- New
- Open

Thermal Model
- General
- Well Header
- Gradients
- Well Schematics
- Reservoir Models
→ Flow Models
- Simulations DTS Data Analysis
- Data Loading
- Analyses
- Resampling
- Depth Correction
- Filtering
- Normalization Optimization
- Optimization Results
- Plots
- Report Inventories Flow Models Select/Create: Flow Model
Name: Flow Model
Comment:
Step Type: Production          Model Type: Transient Flow Correlations
VFlow Correlation: BeggsAndBrillRevised
HFlow Correlation: BeggsAndBrillRevised
Decision Angle: 45

Production
Calculated Varible: Inlet Pressure
Rate Type: ○ Mass  ● Volume
Select Reservoir Model: <--select reservoir model-->

NOTE: All volume flow rates are in stock tank units

| | Duration | Time Subdivision | Step Type | Surface Pressure | Surface Flowing Rate |
|---|---|---|---|---|---|
| | d | d | | psi | bbl/d |
| 1 | 182.5 | 30.14 | Production | 100 | 2700 |
| 2 | 7 | 1 | Shutin | | |
| 3 | 300 | 100 | Shutin | | |

WELL CHARACTERISATION METHOD

BACKGROUND OF THE INVENTION

1. Field of the Invention

The present invention relates to well characterisation. In particular, but not exclusively, it relates to characterisation of a well using distributed temperature sensor (DTS) data to optimise a well model to determine physical parameters that characterise the well. Such a well may, for example, be a production well that can be exploited to produce oil and/or gas.

2. Description of Related Art

Much work has been undertaken by the oil and gas industry in the quest to obtain information that can determine physical parameters that characterise wells in order to provide for efficient production management. For example, a great deal of effort has been expended in providing monitoring equipment that can detect when problems occur during fluid extraction from a well and thereby warn an operator of an abnormal operating condition.

Many types of monitoring equipment using various techniques for measuring physical parameters that characterise wells are known. For example, the temperature profile of the well is one such physical parameter that can provide a well operator with useful information to characterise the well. One technique to obtain a temperature profile employs a downhole optical fibre acting as a DTS. A benefit of using such a DTS is that temperature data can be obtained continuously for the whole of the well without disturbing the flow of fluid from the well. By way of illustration, an example of a method and apparatus for determining flow rates employing a DTS system is described in U.S. Pat. No. 6,618,677, which is incorporated herein by reference.

By providing monitoring equipment that can warn an operator of abnormal operating conditions (such as, for example, where a well produces water rather than oil), the operator may take remedial action to account for the abnormal operating condition. For instance the operator may, upon detecting that water rather than oil is being produced, decide to shut down well production in order to attend to the cause of the abnormal operating condition. In this way, the monitoring equipment aids an operator in managing production.

However, while monitoring equipment exists that can aid an operator in managing production, such monitoring equipment tends only to provide an indication of the abnormal operating condition to the operator once the event has already happened. Thus, this type of monitoring equipment only enables the operator to provide a reactive response to the abnormal operating condition. Moreover, the monitoring equipment may not provide an accurate indication of exactly where in the well the cause of the abnormal operating condition lies. For example, the undesirable water production referred to above may come from one of many potential formation layers. A lack of accurate knowledge regarding the physical parameters of the well, such as this, can in turn lead to an undesirable protracted period of well inoperability or incorrect remedial action.

Accordingly, it can be seen that an improved method of determining physical parameters for characterising a well would be useful, particularly where such physical parameters could be predictively determined.

BRIEF SUMMARY OF THE INVENTION

According to a first aspect of the invention, there is provided a method for characterising a well using DTS data to optimise a well model. The method comprises providing a well model of thermal and flow properties of a well, where the well model has a plurality of adjustable physical parameters. The method also comprises providing a data set made up of a plurality of DTS temperature profiles of the well taken at different times during operation of the well, and running the well model with different combinations of the plurality of adjustable physical parameters to match to the plurality of DTS temperature profiles. The DTS temperature profiles may also be pre-processed to make them consistent with one another.

By pre-processing the plurality of DTS temperature profiles to make them consistent with one another, the method according to this aspect of the invention provides an improved way of determining physical parameters for characterising a well, by, for example, reducing both random and systematic error noise of the DTS temperature profiles. The model according to this aspect of the invention also exhibits improved stability. Moreover, the improvement in the quality of the DTS temperature profile data in turn enables the well model to be more accurately optimised and thereby to provide more reliable indications of the physical parameters that correspond to well characteristics.

The optimised model may be used as a starting model for comparison with a further DTS temperature profile. This allows other physical parameters to be extracted from the further DTS temperature profile, as well as providing a higher level of confidence in those physical parameters.

The method may comprise identifying one or more of the adjustable physical parameters as those whose variations are principally responsible for temporal variations in the thermal and/or flow properties of the well. One benefit of this is the facilitation of the monitoring of individual well characteristics over time, with the benefit that accurate predictions as to the future temporal evolution of these characteristics can be made. This is particularly useful for providing predictive determination of the physical parameters of the well related to production.

Various processing steps may be applied to DTS temperature profile data in order to derive the pre-processed temperature profiles. For example, one or more of the following techniques can be applied: depth correction, depth filtering, normalization, and noise filtering. Together, these techniques ensure that the DTS data corresponds accurately to the profile of the well, whilst also providing for removal of spurious noise from the DTS data.

According to a second aspect of the invention, there is provided a data processing apparatus configured to implement the method according to the first aspect of the invention.

According to a third aspect of the invention, there is provided a computer program product for configuring the data processing apparatus according to the second aspect of the invention.

BRIEF DESCRIPTION OF THE DRAWINGS

Embodiments of the present invention will now be described, by way of example only, with reference to the accompanying drawings where like numerals refer to like parts and in which:

FIG. 9 shows a fifth screen shot taken from the GUI for use in accordance with various embodiments of the present invention;

DETAILED DESCRIPTION OF THE INVENTION

Figure 1:
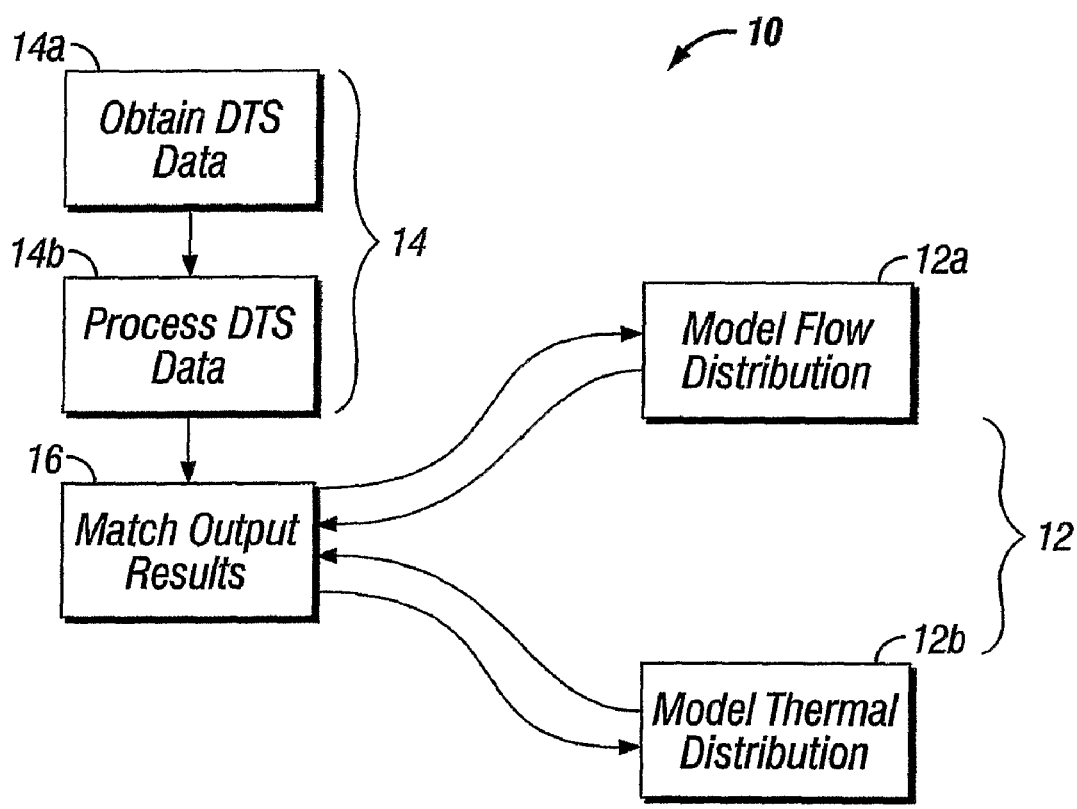
FIG. 1 shows a flow diagram that illustrates a method for characterising a well using DTS data to optimise a well model according to a first embodiment of the present invention.

FIG. 1 shows a flow diagram 10 that illustrates a method for characterising a well using DTS data to optimise a well model. The method comprises operating a well model 12 to model thermal and flow distributions in a well. The well can, for example, be a gas and/or oil producing well, such as that illustrated schematically in FIG. 16A. The well model may be operated in either steady-state or transient conditions. In the first stage 12a, the flow distribution in the well is modeled using a steady-state model. During the second stage 12b, the thermal distribution in the well is modeled using a transient flow model.

The well model 12 models the whole well, and not just a reservoir interval using a transient model. It performs a nodal pressure analysis to calculate fluid properties and uses Joule-Thomson calculations to more accurately model the temperature effects in the near well region.

In one embodiment, the information necessary to set-up the thermal and flow models is provided to a data processing apparatus by a user/operator via a GUI, such as that described below. The GUI provides a sequence of data input screen images that the user can interact with in order to assign various values to various data fields. The GUI methodically guides the user through a data input process in order to obtain the necessary information. Use of such a GUI simplifies data entry and enables the user to apply the method of the invention without requiring detailed expert knowledge.

Once the thermal and flow distributions in the well have been modeled, DTS data is imported and conditioned, using the process at stage 14. Data is obtained at stage 14a, for example, from real-time DTS temperature profile measurements and/or from one or more DTS temperature profiles that have already been acquired. One advantage of various embodiments of the present invention is that a plurality of DTS temperature profiles can be used to provide improved accuracy to aid event prediction and parameter determination. Large amounts of historical DTS data may be used in order to further improve the accuracy of the match between the DTS temperature profiles and the modeled thermal properties of the well.

The DTS temperature profiles data is pre-processed at stage 14b to make the DTS temperature profiles consistent with one another. This enables non-systematic noise variations that appear between the individual DTS temperature profiles to be reduced. At stage 16, the output of the well model 12 is matched with the DTS temperature profiles. Typically, this is done by minimising the root-mean-square difference between the modeled and DTS-derived traces. However, any of a number of numerical techniques may be employed which are well known in the field of data analysis for parameter determination.

If it is detected that the output of the well model 12 does not adequately match the DTS temperature profiles, the physical parameters of the well model 12 are adjusted and the well model is run again to provide a new model of the thermal and flow properties of the well. The process of matching, adjusting the physical parameters, and running the model continues in an iterative manner until a sufficiently accurate match between the DTS temperature profiles and the output of the well model 12 is obtained or until it is determined that no satisfactory match can be found.

When a match is obtained, the results of the DTS temperature profiles and the modeled thermal and/or flow data can be provided to a user. The matched data indicates to the user the location and magnitude of various physical parameters that characterise the well, and make it easy for the user to spot where any anomalies or unusual characteristics occur. Matched data can also be recorded, thereby enabling the monitoring of various physical parameters to be observed and compared over a period of time.

Figure 2:
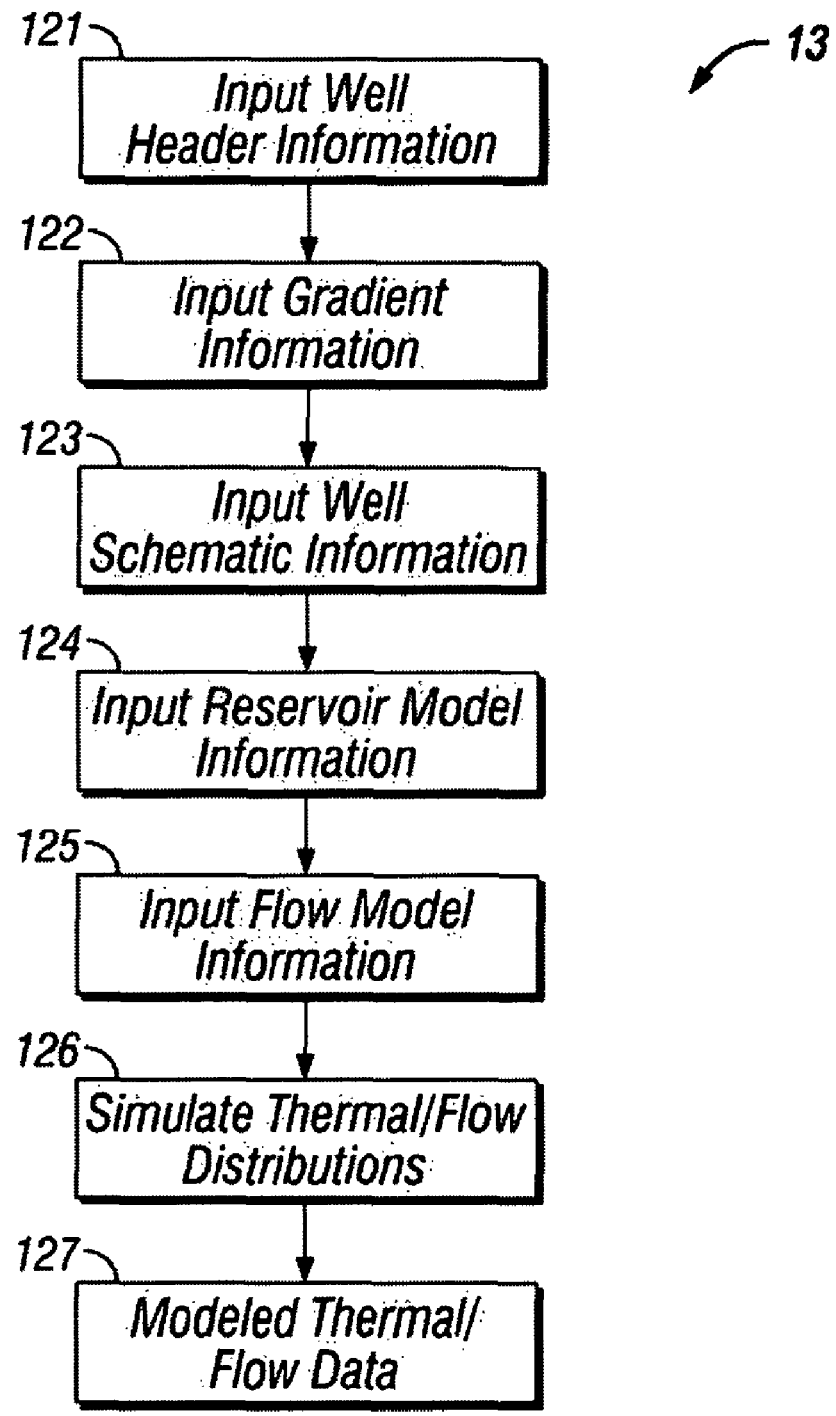
FIG. 2 shows a flow diagram that illustrates a method for modeling thermal and flow data for use in accordance with various embodiments of the present invention.

FIG. 2 shows a flow diagram 13 that illustrates a method for modeling thermal and flow data. Model parameters, such as, for example, zonal flow rates, can be inverted for matching to processed DTS data in order to ensure that the model provides accurate results.

The temperature of flowing fluids is governed by their thermal capacity and conductivity, their initial conditions of temperature, pressure, and flow, and their interaction with the porous rock and wellbore completion. The temperature profile of producing and injection wells varies mainly with flow rates and elapsed time. In order to invert the zonal flow rates, or other model parameters, to match modeled temperature with processed DTS data, this embodiment uses an efficient optimisation algorithm which takes advantage of the structure of the model to efficiently search a solution space while simultaneously checking that a candidate solution is globally feasible.

The well model is provided with well header information at stage 121. The well header information specifies general parameters that identify the type and location of the well. The well header information includes the well name, the wellhead elevation, and the total depth of the well. Optionally, information relating to offshore wells, such as water depth, platform or subsea headers, riser inner/outer diameters, tubing inner/outer diameters, material types, annular fluid types, water depths and water currents can also be provided. Information relating to well trajectory, such as deviation data, may also be added to the model at this stage.

At the next stage 122, geothermal and pressure gradient information is input to the model. Regarding geothermal gradient information, either a simple definition or a complex definition may be provided. In the simple definition, surface ambient temperature, well bottom temperature and, optionally, mudline temperature are provided. For the simple definition, the well temperature profile is defined according to a predetermined profile interpolated between the surface ambient temperature and the well bottom temperature. For the complex definition, temperatures corresponding to specified depth points in the well are provided to define the well temperature profile accurately. Pressure gradient information is input by defining the pressure at a particular depth and a pressure gradient.

Once the geothermal and pressure gradient information has been defined or calculated, well schematic information, such as well and completion geometry information, is input at stage 123 to define the well model. The well and completion geometry is specified by the tubular completion elements, annular fluids and cements, and rock formation properties. Casing and tubing lengths, depths, material types, suppliers, brands, inner/outer diameters, weights, wall thickness, and types can all be specified. For all elements the thermal capacity and conductivity is also provided, and for elements such as rock, additional properties such as porosity and permeability are also provided.

The well and completion geometry is gridded into spatial elements of sufficient size to model the field to the resolution needed, typically from about 1 to about 10 meters vertically and from about 0.01 to about 5 meters radially over the region of interest, with coarser grids used over the less important (overburden) regions. The flow periods are subdivided into time steps for the transient thermal calculation, typically from about 0.1 to about 10 hours, although these may be longer in the case of water injection, for example. Two contiguous grid systems are created, for the wellbore flow and thermal models respectively, with common nodes for both models specified within the flowing wellbore region and at the rock outer boundary. The common nodes ensure that the two physical models are linked to form a coherent hybrid model.

Next, reservoir model information is provided at stage 124. The reservoir model information may be supplied by populating various tables to specify the fluid type, isotropic or x,y,z permeability, static pressure, formation, porosity, fluid temperature, skin, drainage radius, and reservoir thickness for any particular depth zone in or near the well. Alternatively, reservoir model information may be automatically entered into the various tables by specifying a predetermined reservoir model. Such predetermined reservoir models can be created and saved for each well of interest.

Having set up a reservoir model, flow model information is provided at stage 125. A predetermined flow model may be loaded by selecting its name, or new information may be provided. To create a new flow model, step type (e.g. production, injection), model type (e.g. transient), flow correlation information (vertical flow correlation, horizontal flow multiphase correlation, e.g. Beggs and Brill, decision angle), production information (Calculated Variable, e.g. inlet pressure, mass/volume rate type, and reservoir model), duration, time subdivision, step type, surface pressure, and surface flow rate information can be provided.

A well model is created which specifies both the fluid flow parameters and the well completion geometry at stage 126. Fluid types may be selected from a pre-defined list of hydrocarbons and waters, or can be user specified by way of input of fluid characteristic parameters. The well model calculates all the required thermodynamic fluid properties in the well, such as, density, viscosity, heat capacity, conductivity and the Joule-Thomson coefficient. The fluid flow is specified by a combination of pressure and flow boundary conditions at the inlet(s) and outlet(s) of the well, which are the flowing tubular at surface and the outer radial rock elements. These conditions are specified for a series of flowing (or shut-in) periods over which the transient thermal response is calculated.

At the start of the first time step, an iterative well flow calculation is made which results in a complete specification of the pressure, flow rate, and fluid properties in all the fluid elements, and in particular at the common nodes. Using the common node flow, the fluid conditions and the initial thermal boundary conditions, a transient thermal calculation is made of the complete thermal field in all elements. An arbitrary number of time steps can be made, typically from about 10 to about 100, chosen to span a time period of interest. A transient or steady-state thermal calculation can be made by appropriate manipulation of the partial differential equation solution technique. These methods are based upon well known numerical partial differential equation solution techniques, but the convergence criteria have been specifically chosen for optimal performance on the grid systems employed.

To invert flow rates in the well model, initially the flow in each layer is established by successive single variable minimization (SSVM) under the assumption that the local fit is based largely upon the local flow regime. Since local errors are compounded, this approach alone is inadequate to provide a global solution to the inversion problem. It is therefore employed as a fast first pass solution to the inversion problem and is used to seed a continuous variable hybrid genetic algorithm (CGA). The CGA operates on a population of possible solution vectors, including various infeasible ones, generated randomly or in accordance with the energy balance constraint (feasible solutions) and includes the seeding set from the SSVM technique.

The final flow rate solution and its associated modeled temperature are output at stage 127 for reporting and comparison with measured, corrected, and filtered DTS data, obtained as described below. The inverted flow rate solution may then subsequently be used to diagnose well/reservoir behaviour. Typically, the source of unwanted fluids, such as water in an oil or gas producing well, may be determined, allowing effective remedial action to be taken. In this mode, the flow rate solution is analogous to that found by typical production logging operations. However, unlike the common industry practice of production logging well diagnosis, the DTS data can be acquired continuously over the entire producing life of the well, allowing very early detection of anomalous conditions, and also allowing the change in important production parameters (such as zonal reservoir pressure) to be determined over time and related to the reservoir production efficiency. Examples of methods for modelling thermal and flow data are described in SPE 62952, "Using Fibre-Optic Distributed Temperature Measurements to Provide Real-Time Reservoir Surveillance Data on Wytch Farm Field Horizontal Extended-Reach Wells", Society of Petroleum Engineers Inc. 2000, which is incorporated herein by reference.

Figure 3:
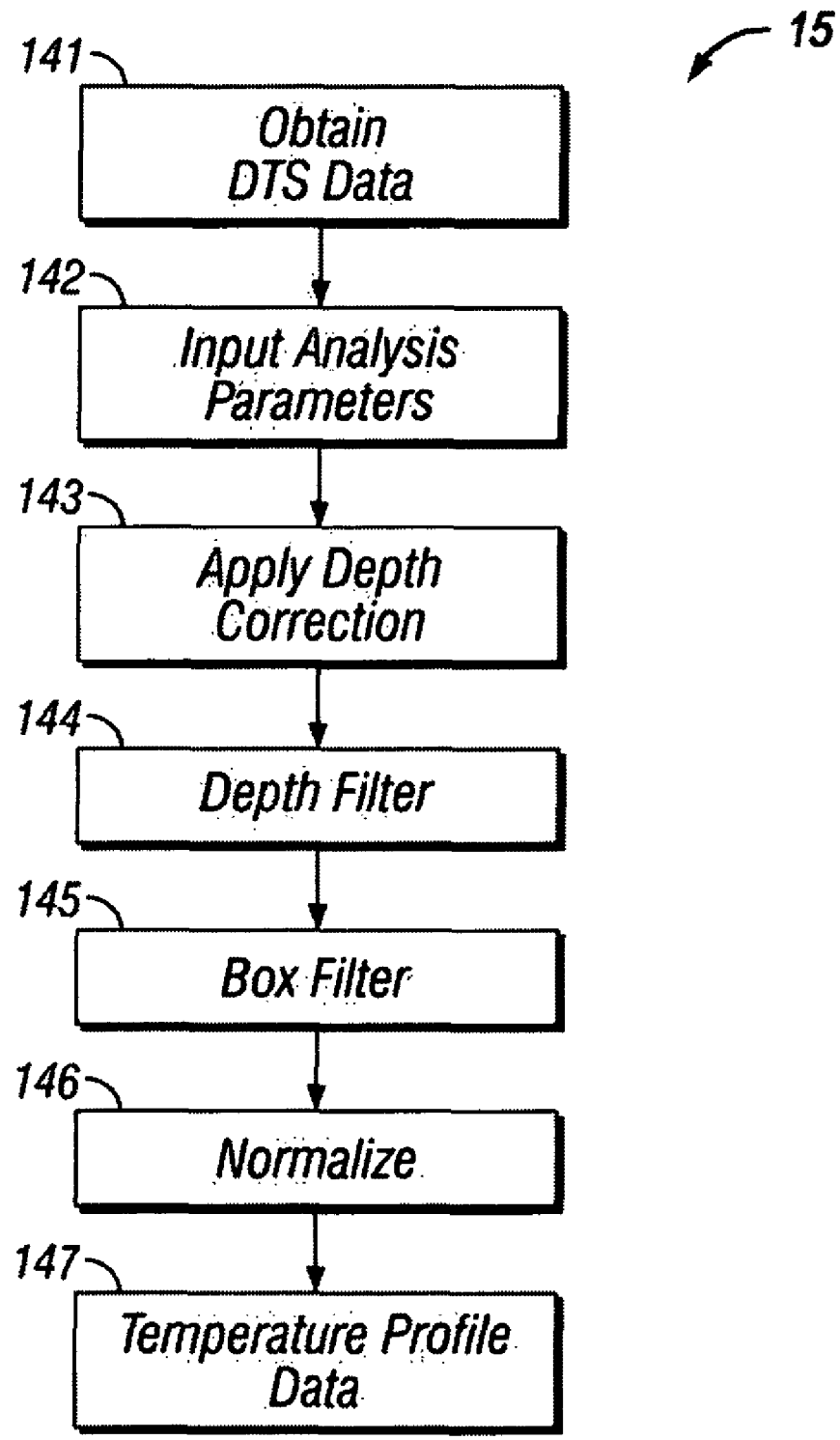
FIG. 3 shows a flow diagram that illustrates a method for providing processed temperature profile data for use in accordance with various embodiments of the present invention.

FIG. 3 shows a flow diagram 15 that illustrates a method for providing processed temperature profile data. DTS data is acquired at various sampling rates in time and is subject to several causes of random and systematic noise. The DTS data is converted from time-of-flight to depth, and zones of interest in depth and time can be selected. The noise may be reduced by processing the raw DTS data by applying specific filters using time and/or depth selection criteria as described below.

At stage 141 DTS data is obtained by reading a recorded data file or interrogating a database which stores DTS temperature profiles. The DTS data set comprises a plurality of individual DTS temperature profiles. Individual DTS temperature profile data may be provided in real-time for analysis from one or more DTS measuring apparatus, or may correspond to stored processed and/or raw DTS temperature profile data imported for use or processing.

Analysis parameters are provided at stage 142 and include the analysis name and start and stop time information for the DTS data. Various DTS temperature profiles can be saved and recalled, as required, by providing an analysis name.

Having obtained the DTS temperature profile data, it is first processed at stage 143 by applying depth correction. Depth correction modifies the DTS data to compensate for well deviations from the vertical. Wellhead depth, actual wellhead depth, DTS fibre turn-around sub (TAS) position and actual TAS depth is supplied. Additionally, at stages 144 and 145, initial depth filtering and subsequent box-car filtering are applied to remove noise artefacts from the DTS data. The corrected DTS depth reference, consistent with the physical well data, is termed measured depth (MD) and is standard nomenclature in the industry.

Once the DTS data has been processed by filtering, it is normalized at stage 146 by applying a systematic shift to set a portion of the DTS data to a known value for DTS data found in a region of the well that is known to be thermally stable. The top and bottom of this thermally stable zone can be specified in terms of the values of MD. Normalization of the DTS data in this manner reduces jitter in the data and thus improves the overall results of the analysis. The resulting processed DTS temperature profile data is provided at stage 147, and may be displayed visually and/or used for further analytical purposes, such as, for example, as a target data set used when automatically adjusting the model described below.

Figure 4:
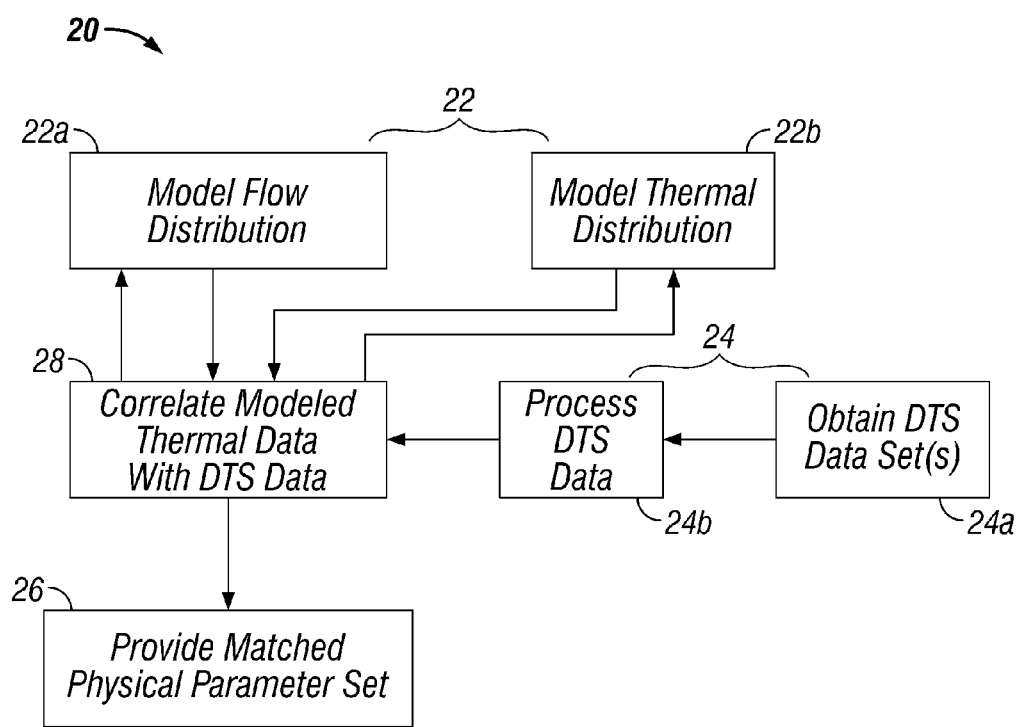
FIG. 4 shows a flow diagram that illustrates a method for characterising a well using DTS data to optimise a well model according to a second embodiment of the present invention.

FIG. 4 shows a flow diagram 20 that illustrates a method for providing comparative data for determining physical characteristics of a well. The method comprises operating a well model 22 to model thermal and flow distributions in a well. The well will typically be an oil and/or gas producing well, such as that illustrated schematically in FIG. 16A. The well model may be operated in either steady-state or transient conditions. In the first stage 22a, the flow distribution in the well is modeled using a steady-state model. During the second stage 22b, the thermal distribution in the well is modeled using a transient model. The well model 22 models the whole well, and not just a reservoir interval using a transient model. It performs a nodal pressure analysis to calculate fluid properties and uses Joule-Thomson calculations to more accurately model the temperature effects in the near well region.

In one embodiment, the information necessary to set-up the thermal and flow models is provided to a data processing apparatus by a user/operator via a GUI, such as that described below in connection with FIGS. 5 to 15. The GUI provides a sequence of data input screen images that the user can interact with in order to assign various values to various data fields. The GUI methodically guides the user through a data input process in order to obtain the necessary information. Use of such a GUI simplifies data entry and enables the user to apply the various methods of the invention without requiring detailed expert knowledge.

The results of an initial simulation of the well model 22 are obtained, for example, by using the method as described above in relation to FIGS. 2 and 3. Once the initial results have been obtained, the modeled thermal data is correlated at stage 28 with the DTS data, obtained 24a and processed 24b at stage 24, for example, according to the manner described above.

An iterative comparison of modeled thermal data and the processed DTS data continues until either a sufficiently accurate match is obtained or a predetermined number of numerical iterations have been completed. In the latter case, a message may be generated to alert a user that no sufficiently accurate match has been found. The user may then adjust the model parameters or set new accuracy limits.

Having determined the optimal model 22 based upon the DTS temperature profiles, the user/operator may inspect the results and provide a report to the field operator, or automated feature extraction can be applied at stage 26 to extract predetermined physical parameters that require further investigation. Typically, these features would be a change in zonal flow rate or zonal reservoir pressure of more than expected amount, for example, if a zonal oil flow rate decreases by 10 percent or more, or if a zonal reservoir pressure decreases by 100 psi or more.

Should such physical parameter changes be identified, they may be notified to an operator, for example, by way of triggering an alarm or presenting a warning message to a user on a computer monitor. Hence, using this method, the well can be automatically characterised and any anomalies accurately and automatically identified, thereby alerting an operator to existing or potential problems that might require attention.

Figure 5:
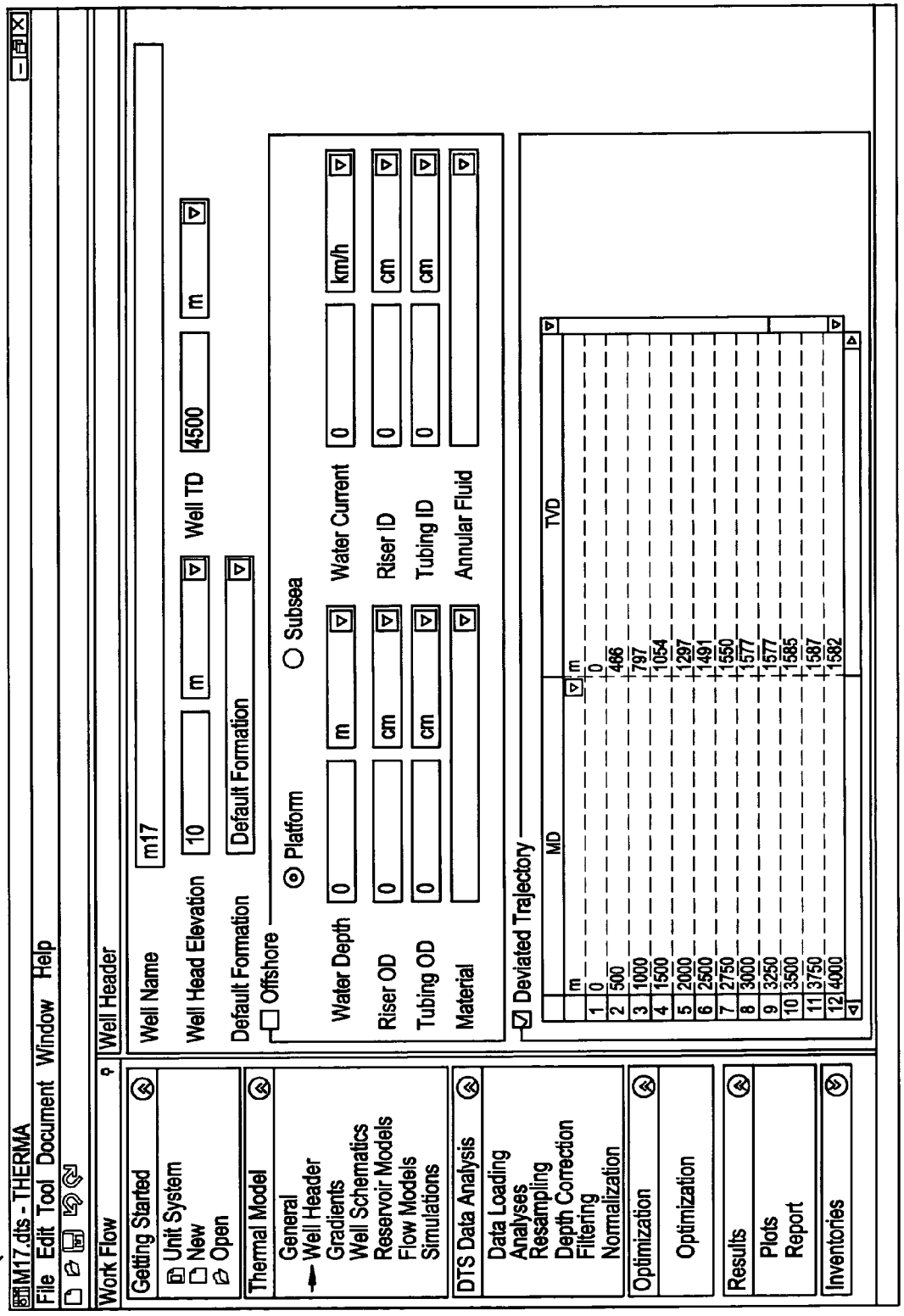
FIG. 5 shows a first screen shot taken from a graphical user interface (GUI) for use in accordance with various embodiments of the present invention.

FIG. 5 shows a first screen shot 500 taken from a GUI. Well header information specifying general parameters that identify the type and location of the well may be input to the model using this part of the GUI. The well header information includes the well name, the wellhead elevation, and the total depth of the well. Optionally, information relating to offshore wells, such as water depth, platform or sub-sea headers, riser inner/outer diameter, tubing inner/outer diameter, material type, annular fluid type, water depth and water current can also be input. Information relating to well trajectory, such as deviation data, may also be added to the model using this part of the GUI.

The GUI itself is suitable for configuring a data processing apparatus to implement the methods described herein. Such a GUI greatly facilitates the input of the various parameters needed to configure the well model and identify the source or sources of the DTS temperature profiles. Moreover, such a GUI provides great flexibility when selecting various model types, data types, input sources, etc., and also provides a structured and co-ordinated input tool that reduces the burden on an operator.

Figure 6:
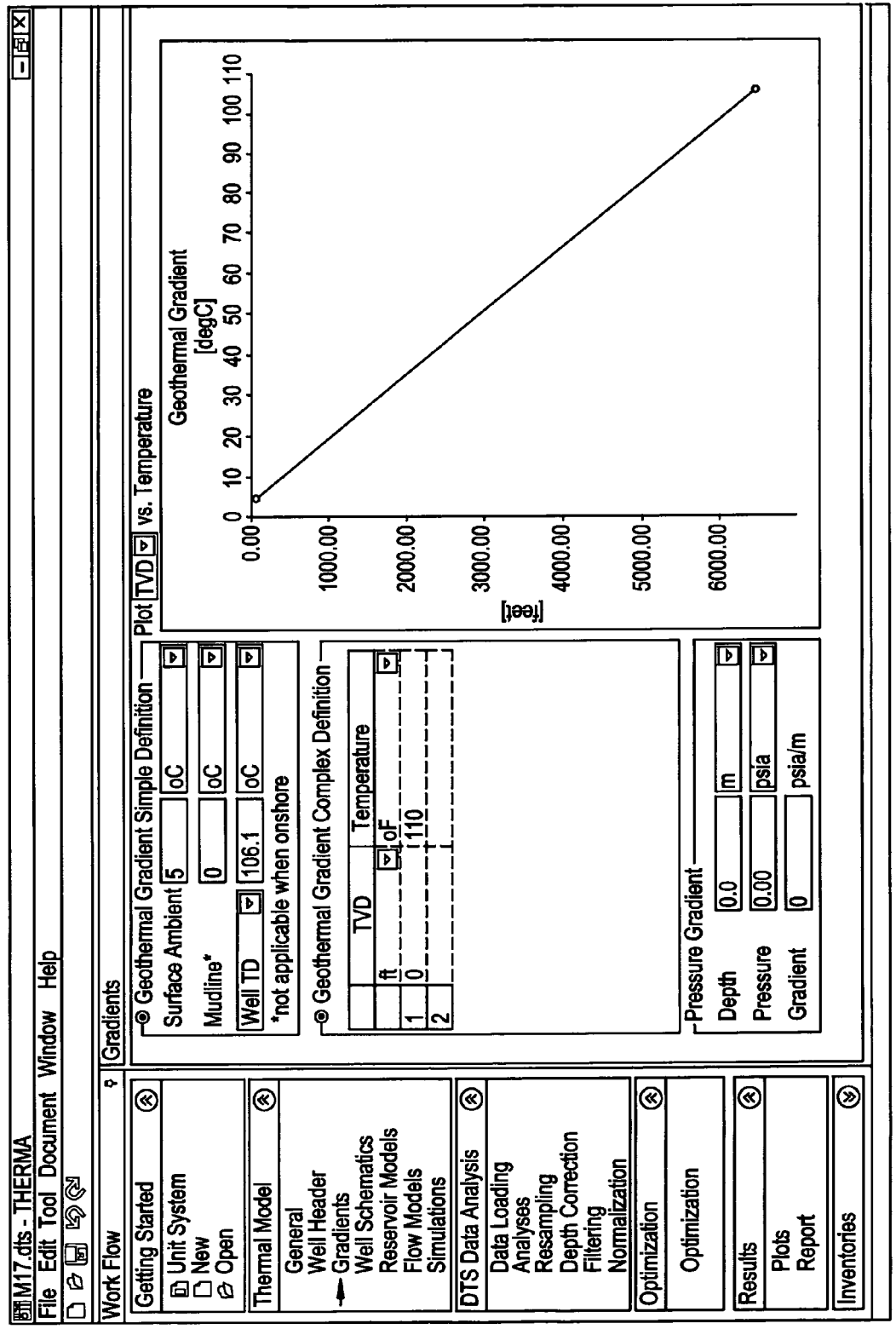
FIG. 6 shows a second screen shot taken from the GUI for use in accordance with various embodiments of the present invention.

FIG. 6 shows a second screen shot 510 taken from a GUI. Using this part of the GUI, geothermal and pressure gradient information is input to the model. Either a simple or a complex geothermal gradient definition may be provided. In the simple definition surface ambient temperature, well bottom temperature, and, optionally, mudline temperature are input.

For the simple definition, the well temperature profile is defined according to a predetermined profile interpolated between the surface ambient temperature and the well bottom temperature. For the complex definition, temperatures corresponding to specified depth points in the well are input to define the well temperature profile accurately. Pressure gradient information is input either by setting a pressure at a specific depth and a gradient, or by inputting a plot of pressure as a function of depth.

Figure 7:
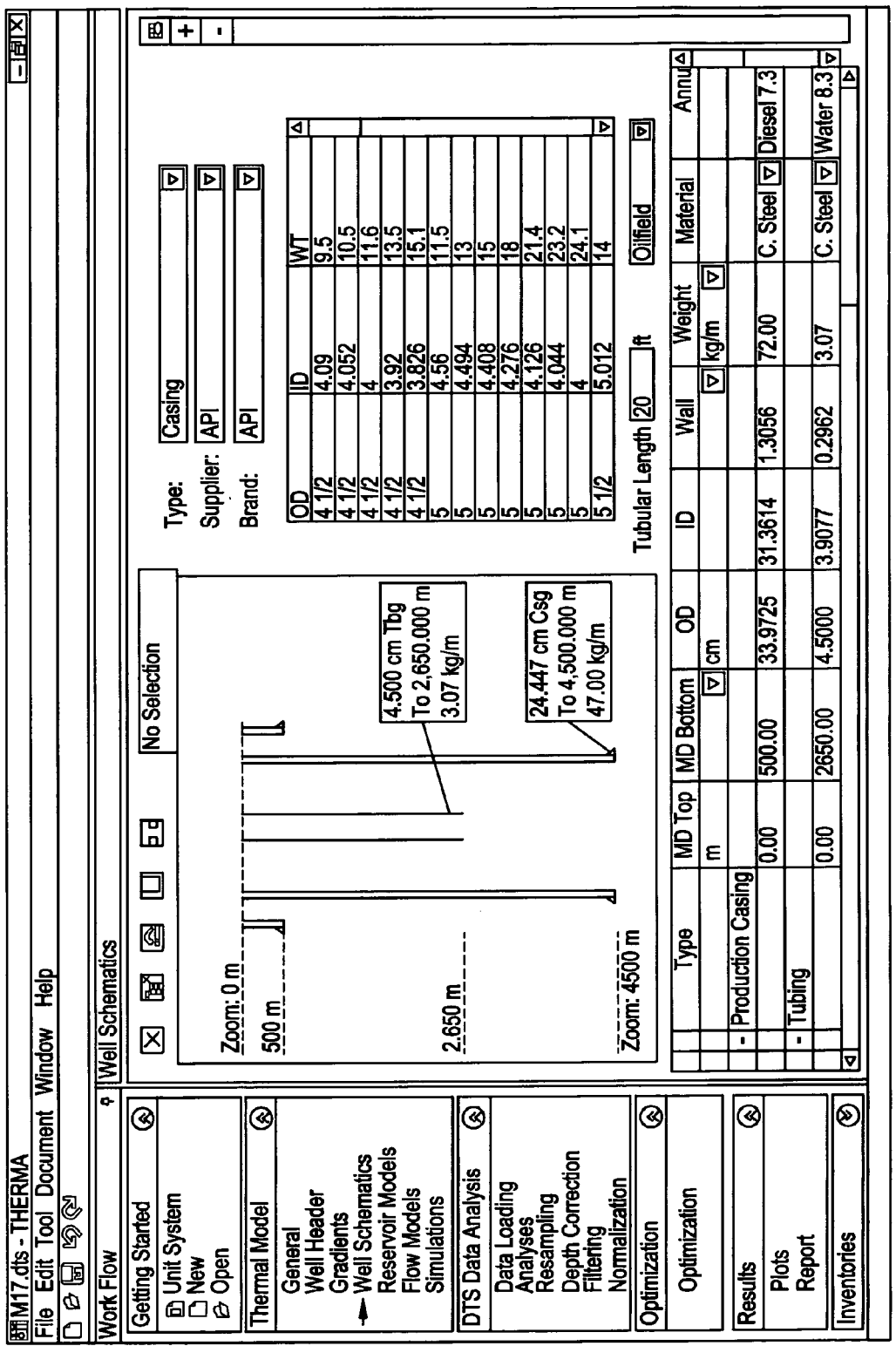
FIG. 7 shows a third screen shot taken from the GUI for use in accordance with various embodiments of the present invention.

FIG. 7 shows a third screen shot 520 taken from a GUI. The well model is set up by inputting well schematic information, such as well and completion geometry information. The well and completion geometry is specified by the tubular completion elements, the annular fluids and cements, and the rock formation properties. Casing and tubing lengths, depths, material types, suppliers, brands, inner/outer diameters, weights, wall thicknesses and types can all be input using this part of the GUI. For all elements the thermal capacity and conductivity is also input or derived automatically using look-up tables, and for elements such as rock, additional properties such as porosity and permeability are also obtained.

Figure 8:
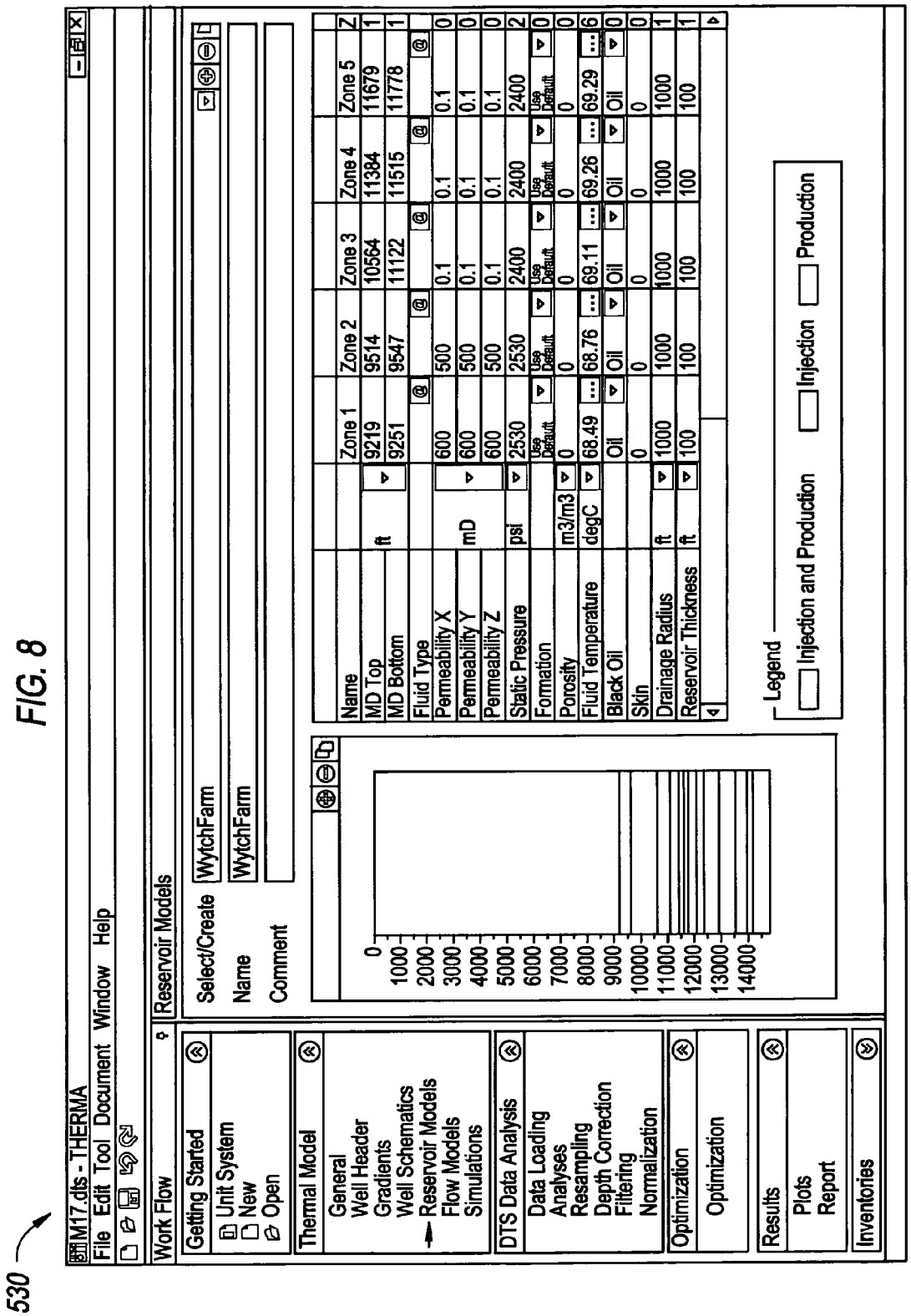
FIG. 8 shows a fourth screen shot taken from the GUI for use in accordance with various embodiments of the present invention.

FIG. 8 shows a fourth screen shot 530 taken from a GUI. Reservoir model information is input using this part of the GUI. The reservoir model information may be supplied by populating various tables to specify the fluid type, isotropic or x,y,z permeability, static pressure, formation, porosity, fluid temperature, skin, drainage radius, and reservoir thickness for any particular depth zone in or near the well. Alternatively, well reservoir model information may be automatically entered into the various tables by specifying a predetermined reservoir model. Such predetermined reservoir models can be created and saved for each well of interest.

FIG. 9 shows a fifth screen shot 540 taken from a GUI. Flow model information is provided using this part of the GUI. A predetermined flow model may be loaded by selecting its name, or new information may be input. Step type (e.g. production, injection), model type (e.g. transient), flow correlation information (vertical flow correlation, horizontal flow multiphase correlation, e.g. Beggs and Brill, decision angle), production information (Calculated Variable, e.g. inlet pressure, mass/volume rate type, and reservoir model), duration, time subdivision, step type, surface pressure and surface flow rate information can be input.

Figure 10:
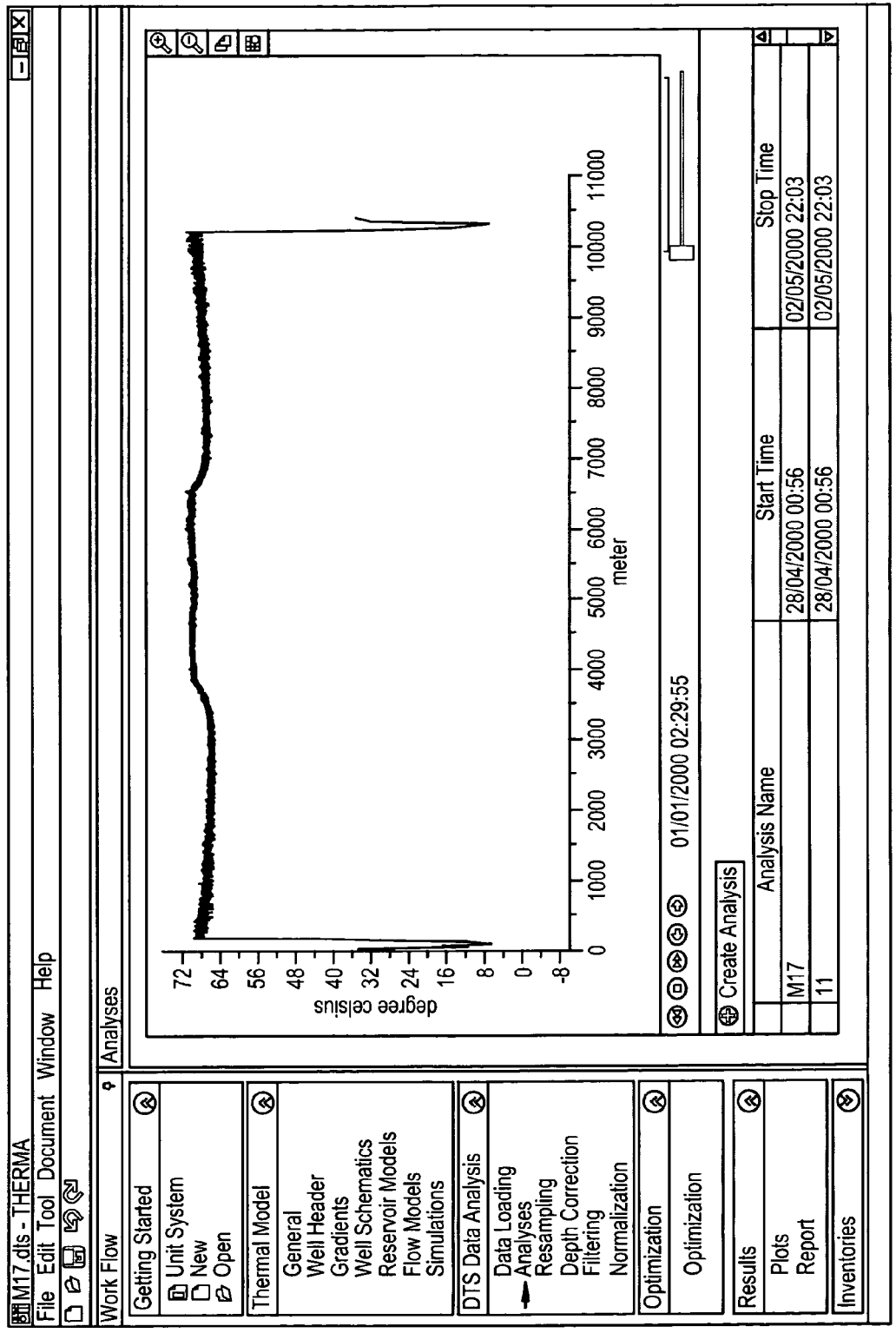
FIG. 10 shows a sixth screen shot taken from the GUI for use in accordance with various embodiments of the present invention.

FIG. 10 shows a sixth screen shot 550 taken from a GUI. Data identifying one or more DTS data sets is input in a table. Associated DTS data acquisition start/stop times may also be input to the table or retrieved for a corresponding DTS data set. The DTS data is displayed as a plot of temperature versus depth for a particular time in the interval defined by the start/stop times.

Figure 11:
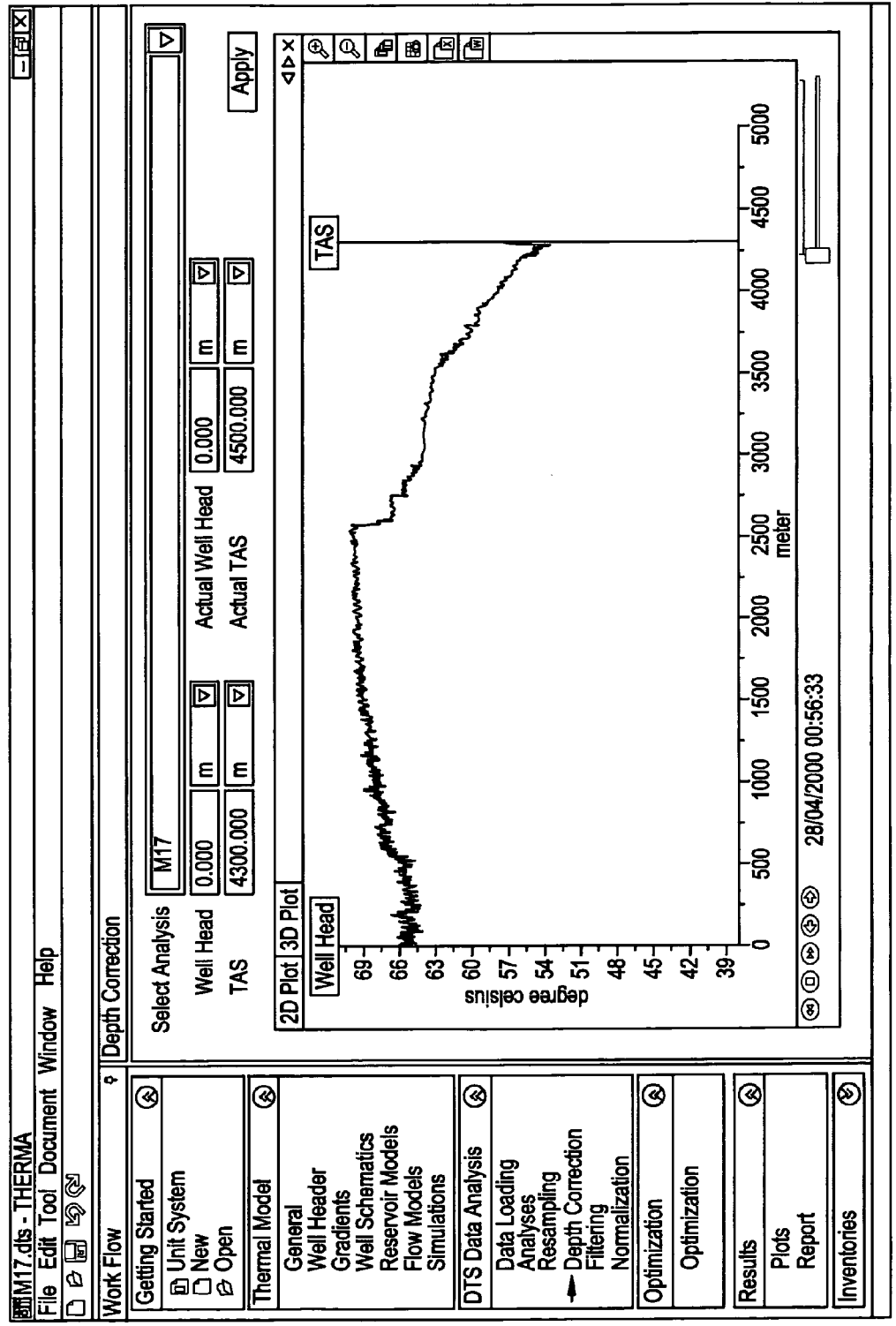
FIG. 11 shows a seventh screen shot taken from the GUI for use in accordance with various embodiments of the present invention.

FIG. 11 shows a seventh screen shot 560 taken from a GUI. Depth correction parameters for the wellhead depth, actual wellhead depth, TAS and actual TAS depth data can be input. A 2-D plot of corrected DTS data obtained at a particular time is shown. A user may adjust the time of the DTS data displayed by clicking the arrows or moving the slider provided on the GUI.

Figure 12:
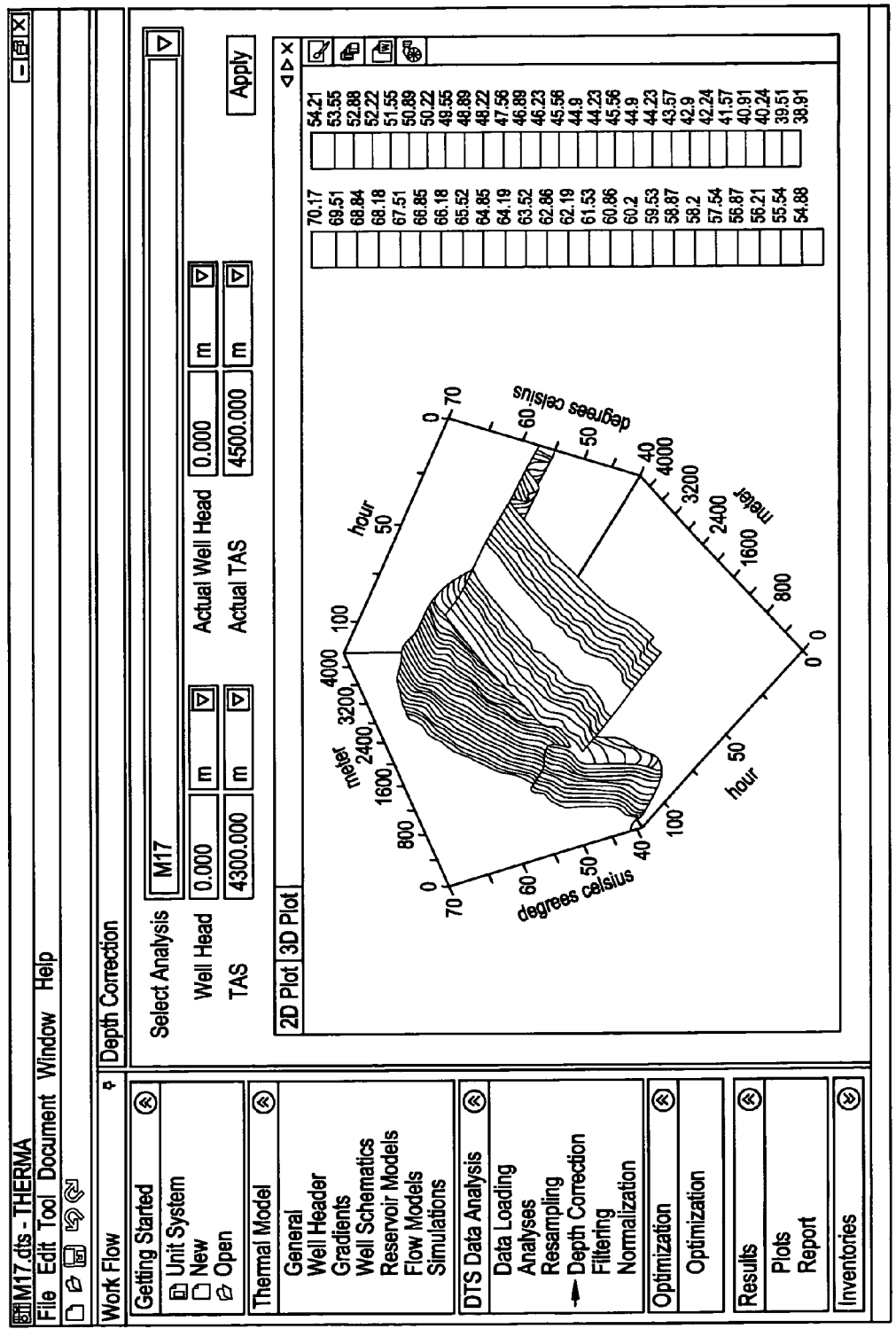
FIG. 12 shows an eighth screen shot taken from the GUI for use in accordance with various embodiments of the present invention.

FIG. 12 shows an eighth screen shot 570 taken from a GUI. The GUI output shown illustrates the DTS data in 3-D, and shows how the DTS data varies with depth and time. This is a particularly useful tool to help well managers/operators visualise the temporal evolution of the well, as it is relatively easy to see where any discontinuities in the DTS data occur.

Figure 13:
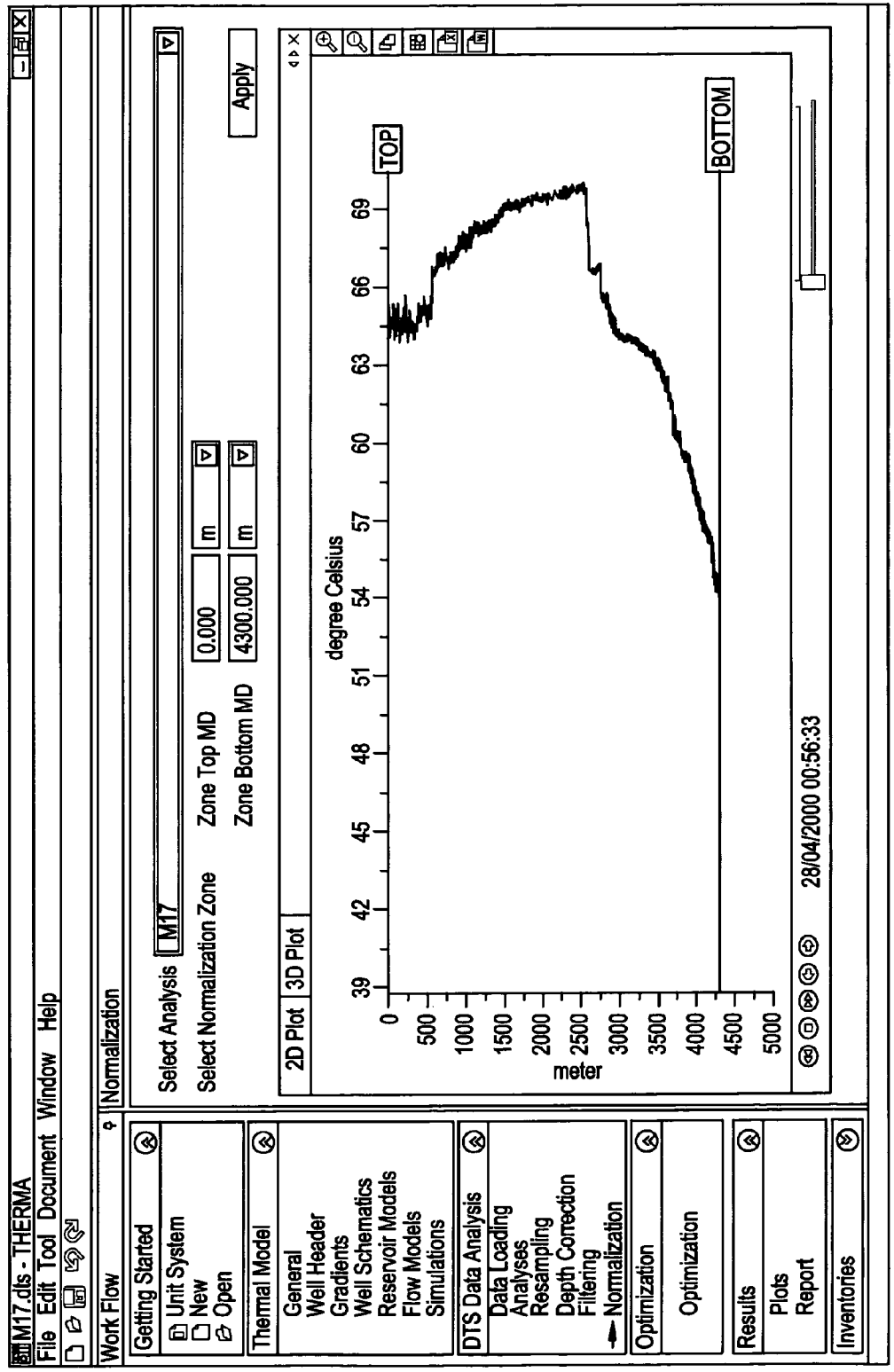
FIG. 13 shows a ninth screen shot taken from the GUI for use in accordance with various embodiments of the present invention.

FIG. 13 shows a ninth screen shot 580 taken from a GUI. This part of the GUI allows a user to input information identifying the DTS data set to be used and to define the measured depth top and bottom of the zone to be used for normalization. As with various of the other graphical representations provided by the GUI, a 2-D or 3-D data display can be selected. In this case, a 2-D plot is shown illustrating how the normalized DTS data varies with depth.

Figure 14:
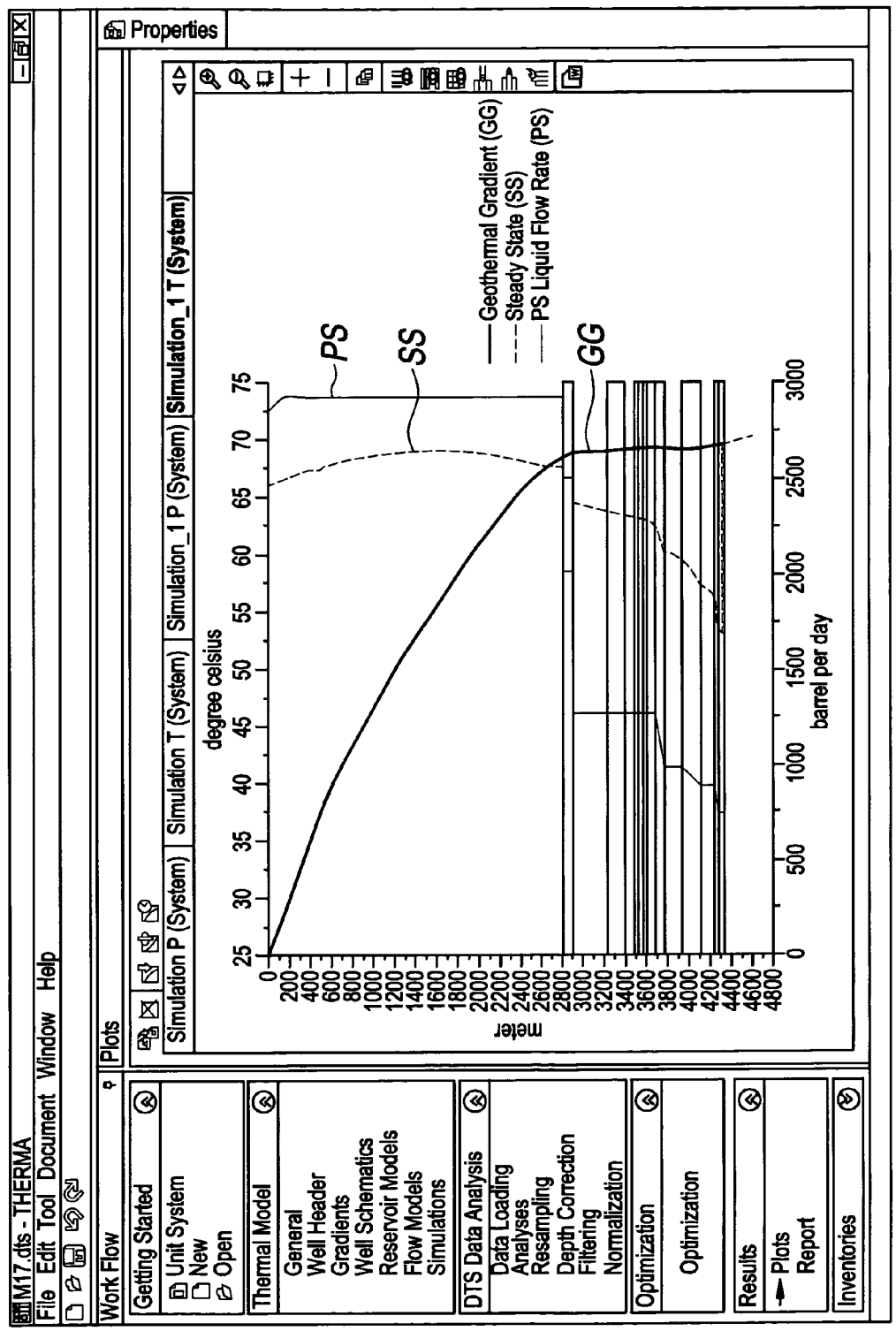
FIG. 14 shows a tenth screen shot taken from the GUI for use in accordance with various embodiments of the present invention.

FIG. 14 shows a tenth screen shot 590 taken from a GUI. The screen shot shows simulation results presented by the GUI. The results show a well depth profile, indicating the various formation layers, overlaid with temperature versus depth plots for the geothermal gradient (GG) and steady state (SS) and also the PIPESIM liquid flow rate (PS) versus depth. PIPESIM is a general multiphase flow simulator for wells available from Hyprotech of Calgary, Alberta, Canada.

Figure 15:
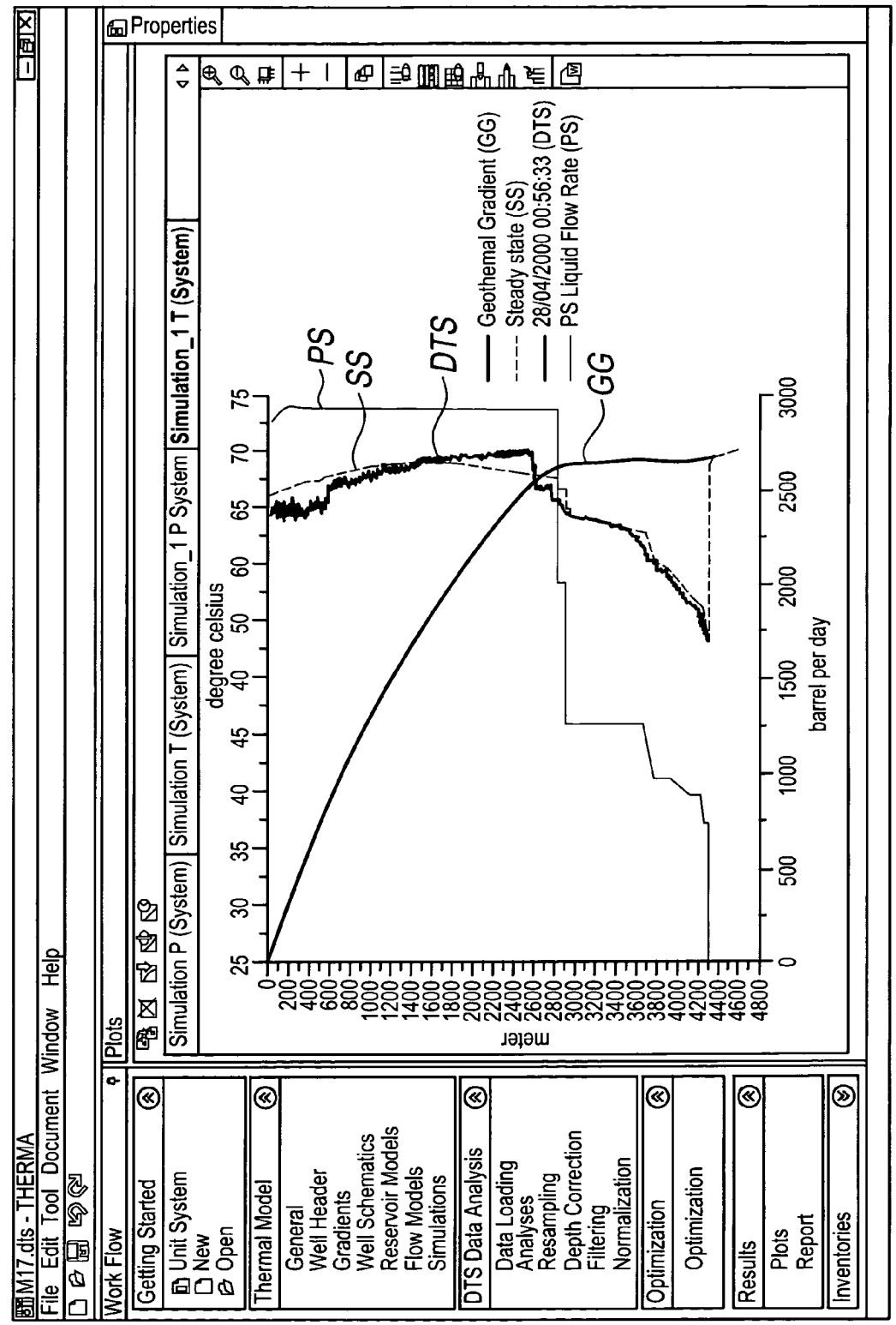
FIG. 15 shows an eleventh screen shot taken from the GUI for use in accordance with various embodiments of the present invention.

FIG. 15 shows an eleventh screen shot 600 taken from a GUI. The screen shot shows plot and analysis results presented by the GUI. The results show well depth profile plots of the geothermal gradient (GG), the steady state (SS) temperature, the PIPESIM liquid flow rate (PS), and the normalized DTS data (DTS).

Figure 16A:
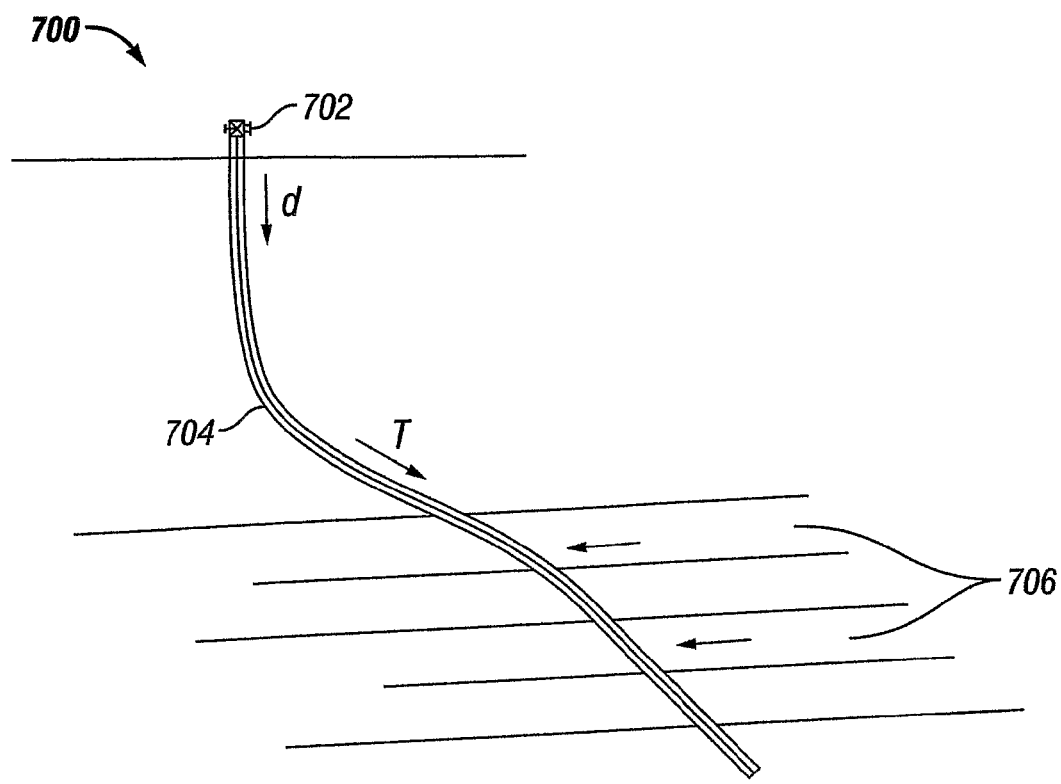
FIG. 16A shows a schematic illustration of a well for which physical characteristics derived in accordance with various embodiments of the present invention may be obtained.

FIG. 16A shows a schematic illustration of a well 700 for which physical characteristics may be obtained. The well 700 comprises a wellbore 704 that passes though a number of production zones 706. A wellhead 702 is provided at the surface of the wellbore 704. The production zones 706 may provide oil and/or gas under pressure into the wellbore 704. The oil and/or gas then passes through the wellbore 704 to the wellhead 702 where it is collected for separation and/or storage.

Figure 16B:
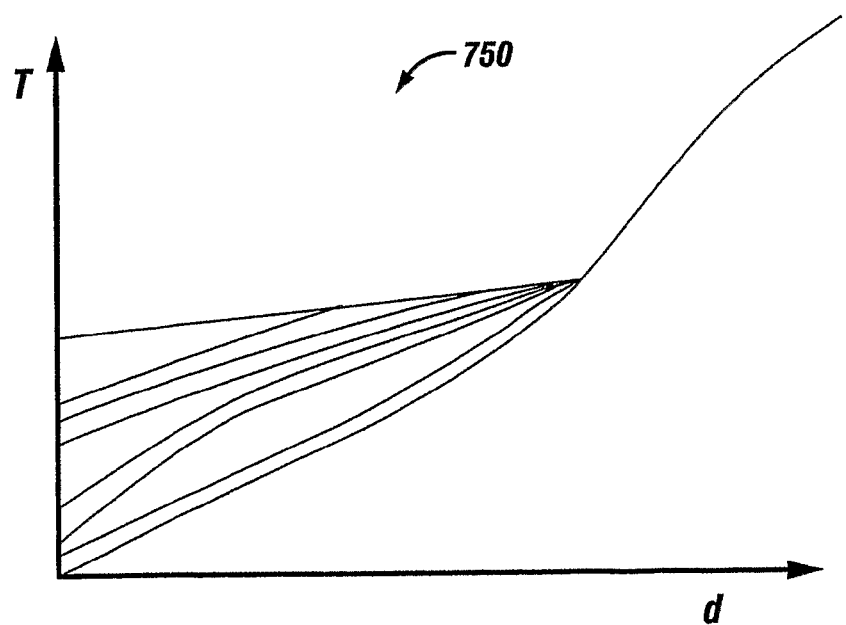
FIG. 16B shows a schematic illustration of a temperature profile of the well illustrated in FIG. 16A.

FIG. 16B shows a schematic illustration of a temperature profile 750 in the wellbore 704 of the well 700 illustrated in FIG. 16A. As can be seen from the temperature profile 750, the temperature in the wellbore 704 increases with increasing depth.

Figure 17:
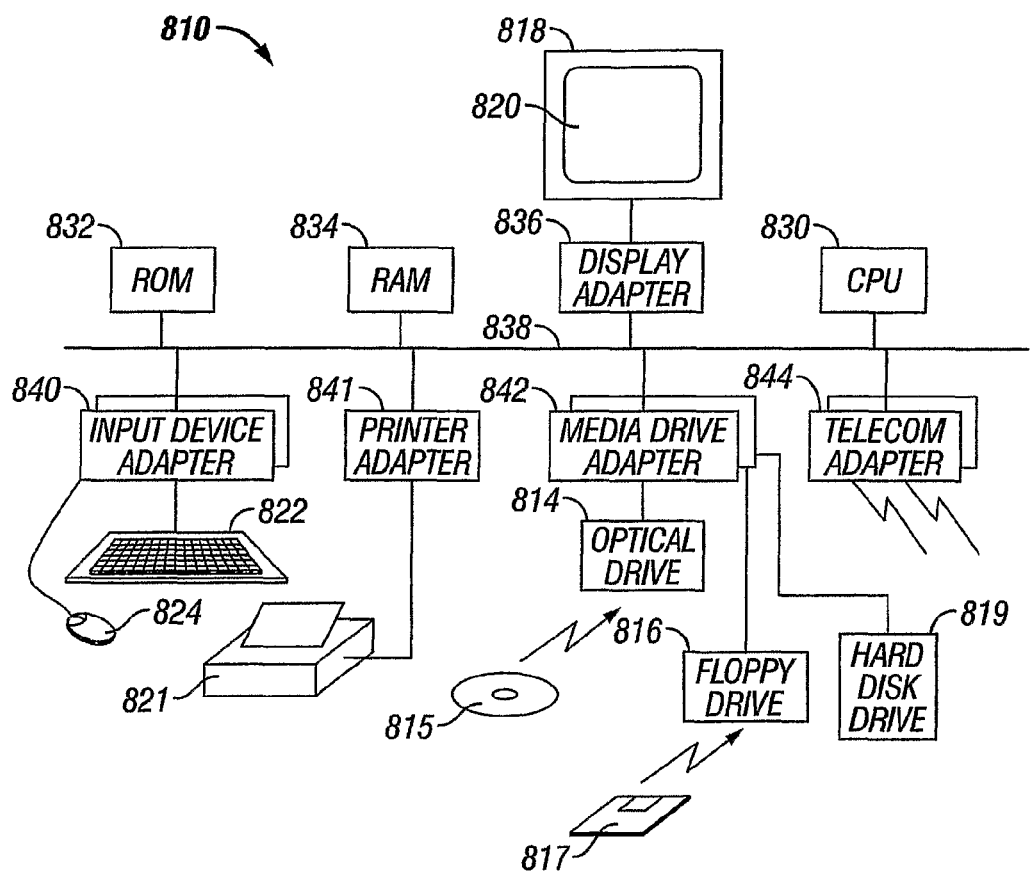
FIG. 17 shows computer program products and a data processing apparatus for providing various embodiments of the present invention.

FIG. 17 shows computer program products 815, 817 and a schematic and simplified representation of a data processing apparatus 810 for providing various embodiments of the present invention.

The data processing apparatus 810 comprises various data processing resources such as a processor (CPU) 830 coupled to a bus structure 838. Also connected to the bus structure 838 are further data processing resources such as read only memory 832 and random access memory 834. A display adapter 836 connects a display device 818 having a display area 820 to the bus structure 838. One or more user-input device adapters 840 connect the user-input devices, including the keyboard 822 and mouse 824 to the bus structure 838.

An adapter 841 for the connection of the printer 821 may also be provided. One or more media drive adapters 842 can be provided for connecting the media drives, for example the optical disk drive 814, the floppy disk drive 816, and hard disk drive 819, to the bus structure 838. One or more telecommunications adapters 844 can be provided thereby providing processing resource interface means for connecting the computer system to one or more networks or to other computer systems. The communications adapters 844 could include a local area network adapter, a modem and/or ISDN terminal adapter, or serial or parallel port adapter, as required.

Those skilled in the art will understand that various aspects and/or embodiments of the invention may be used in conjunction with various other known well characterizing techniques. For example, results provided by applying modeling/DTS data analysis may be checked/corroborated with further measured data, such as, for example, flow rate/fluid type/fluid pressure, measured at a well head or elsewhere.

Those skilled in the art will also understand that any methods, or steps therein, as described herein may be implemented on a data processing apparatus suitably configured by a computer program. Such a computer program may be provided as a computer program product supplied on a carrier medium. The carrier medium may include at least one of the following set of media: a radio-frequency signal, an optical signal, an electronic signal, a magnetic disk or tape, solid-state memory, an optical disk, a magneto-optical disk, a compact disk and a digital versatile disk.

What is claimed is:

1. A method for characterising a well using distributed temperature sensor (DTS) data to optimise a well model, comprising:
    providing a well model of thermal and flow properties of a well, the well model having a plurality of adjustable physical parameters;
    providing a data set made up of a plurality of DTS temperature profiles of the well taken at different times during operation of the well;
    running the well model on a processor based system with different combinations of the plurality of adjustable physical parameters to match to the plurality of DTS temperature profiles; and
    outputting results from running the well model to a graphical user interface to characterize the well.

2. The method of claim 1, further comprising applying the optimised model as a starting model for comparison with a further DTS temperature profile.

3. The method of claim 1, further comprising identifying one or more of the adjustable physical parameters as those whose variations are principally responsible for temporal variations in the thermal and/or flow properties of the well.

4. The method of claim 1, further comprising pre-processing the plurality of DTS temperature profiles to make them consistent with one another.

5. The method of claim 4, wherein the pre-processing comprises applying depth correction to the plurality of DTS temperature profiles.

6. The method of claim 4, further comprising applying depth filtering to the plurality of DTS temperature profiles during pre-processing.

7. The method of claim 4, further comprising applying noise filtering to the plurality of DTS temperature profiles during pre-processing.

8. The method of claim 4, further comprising normalizing the DTS temperature profiles during pre-processing.

9. A system for characterising a well using distributed temperature sensor (DTS) data to optimise a well model, comprising:
    a processor;
    a display;
    a well model of thermal and flow properties of a well, the well model having a plurality of adjustable physical parameters and being executable on the processor; and
    a data set made up of a plurality of DTS temperature profiles of the well taken at different times during operation of the well;
    wherein the processor is operable to execute the well model with different combinations of the plurality of adjustable physical parameters to match to the plurality of DTS temperature profiles and to provide an output to the display to facilitate characterization of the well.

* * * * *